United States Patent [19]

Buker

[11] 3,960,406

[45] June 1, 1976

[54] SEAT WITH ANTI-THEFT STRUCTURE

[75] Inventor: Edward Buker, Lake Forest, Ill.

[73] Assignee: Coach & Car Equipment Corporation, Elk Grove Village, Ill.

[22] Filed: Jan. 13, 1975

[21] Appl. No.: 540,515

[52] U.S. Cl............................... 297/345; 248/161; 248/203; 297/349
[51] Int. Cl.².......................................... A47C 3/00
[58] Field of Search ........... 297/349, 345; 248/161, 248/415–418, 203

[56] References Cited
UNITED STATES PATENTS

| | | | |
|---|---|---|---|
| 1,683,722 | 11/1928 | Morin | 248/203 X |
| 2,048,148 | 7/1936 | Stoll | 248/415 X |
| 2,293,144 | 8/1942 | Jones | 297/349 X |
| 2,306,891 | 12/1942 | McArthur | 248/418 X |
| 3,080,186 | 3/1963 | Grant | 248/415 |
| 3,559,942 | 2/1971 | Lucasey | 248/418 X |
| 3,642,320 | 2/1972 | Ward | 297/349 |
| 3,708,203 | 1/1973 | Barecki | 297/349 |
| 3,724,798 | 4/1973 | Lucasey | 248/418 |
| 3,788,584 | 1/1974 | Deike | 248/203 |
| 3,801,055 | 4/1974 | Stenger | 248/203 |

Primary Examiner—James T. McCall
Attorney, Agent, or Firm—Merriam, Marshall, Shapiro & Klose

[57] ABSTRACT

A seat is attached to the top of a vertically disposed trunnion member mounted for rotation about a vertical axis relative to a vertically disposed tubular intermediate member. The trunnion member and intermediate member are vertically adjustable together relative to a vertically disposed tubular base member. All three members are secured together into an assembly by a plurality of securing elements. The seat and trunnion member cannot be removed from the assembly without removing or disengaging a securing element. None of the detachably engaged securing elements are accessible. The only accessible securing element cannot be removed from a securing disposition without destruction thereof. This provides an effective mechanical and psychological deterrent against theft of the seat.

9 Claims, 7 Drawing Figures

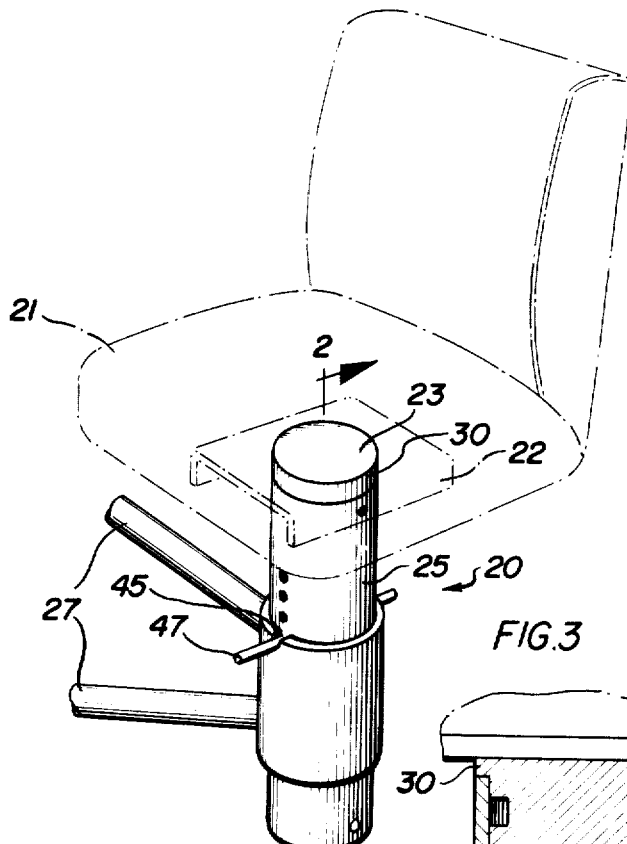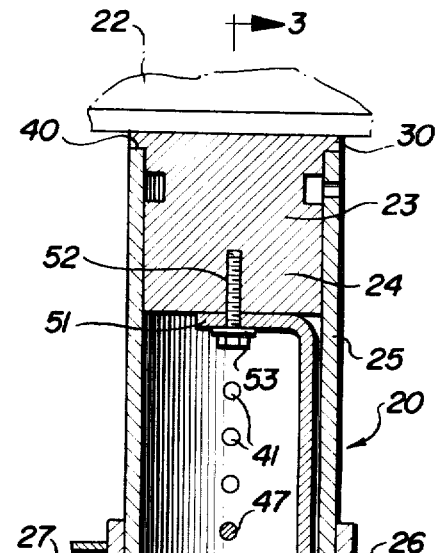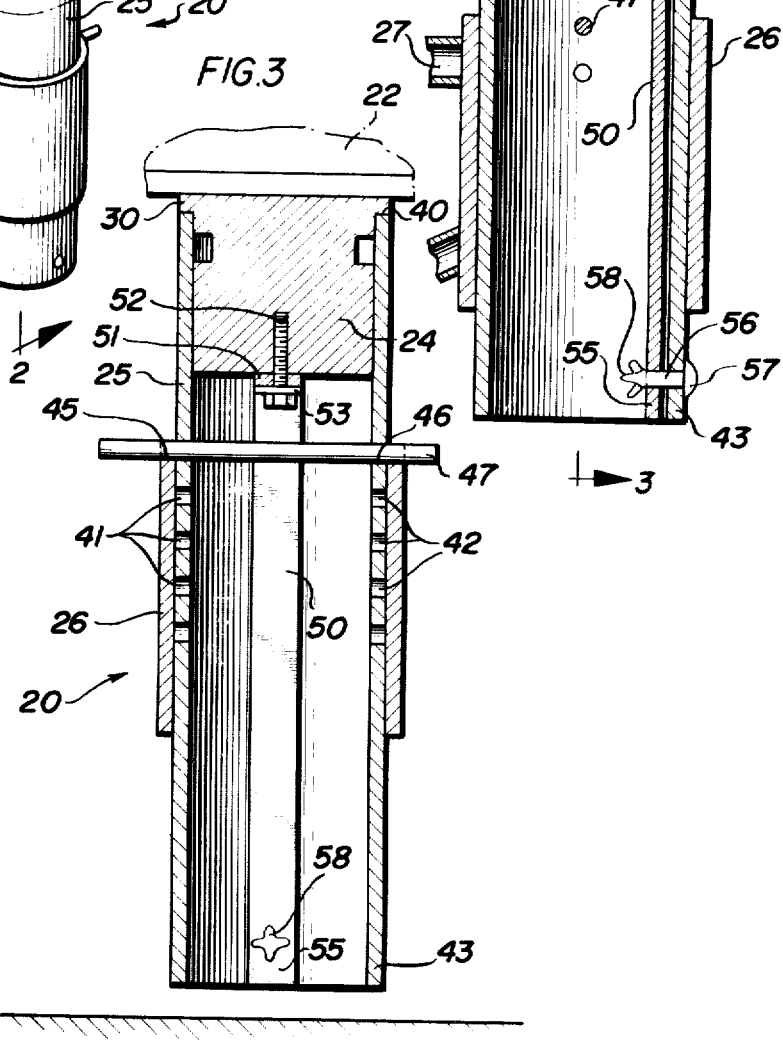

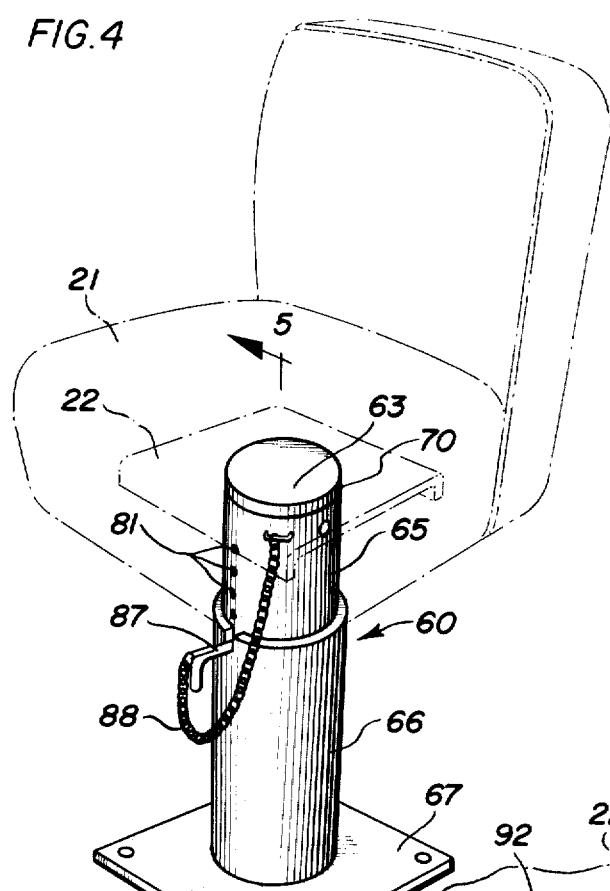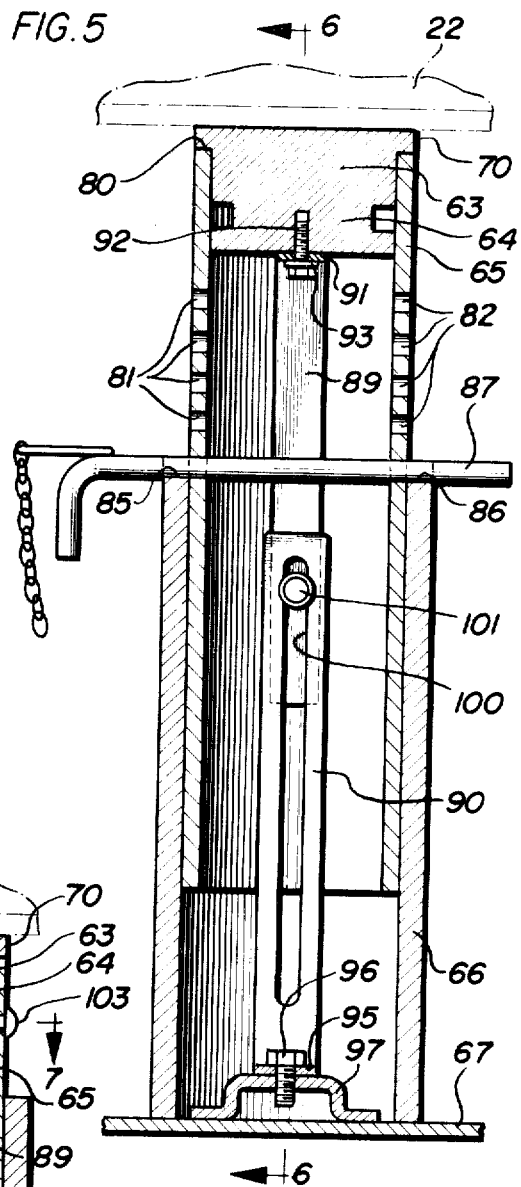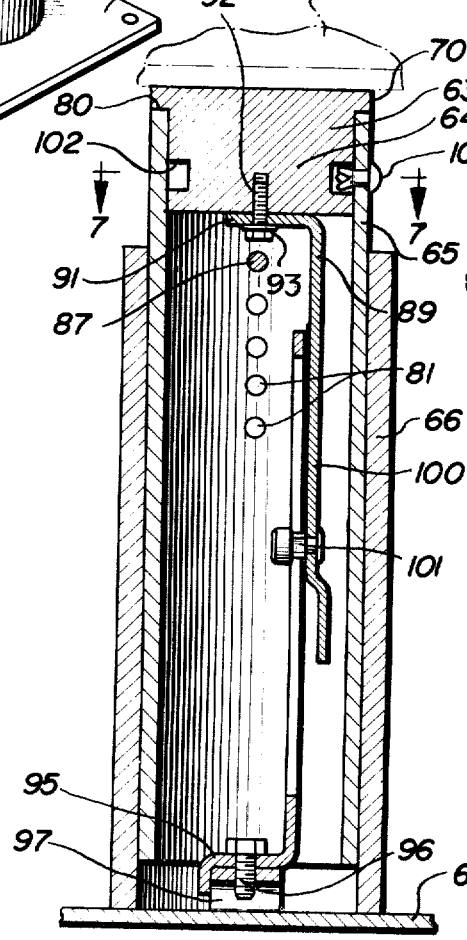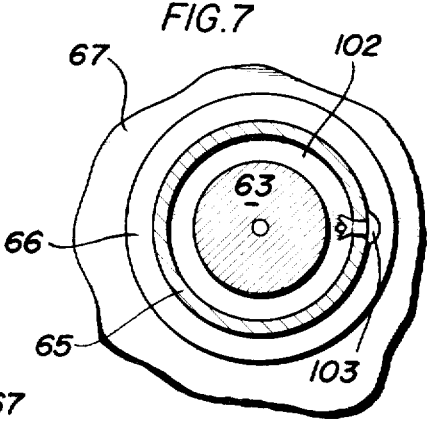

3,960,406

SEAT WITH ANTI-THEFT STRUCTURE

BACKGROUND OF THE INVENTION

The present invention relates generally to seats for crew members of vehicles such as locomotives and more particularly to seats of this type with structure for preventing or minimizing theft of the seat from the vehicle.

Conventional crew seats are generally attached atop a vertically disposed trunnion member comprising part of an assembly in which the vertical trunnion member is usually received within a vertically disposed tubular intermediate member in turn supported by a vertically disposed tubular base member which rests on the floor of the vehicle or is cantilevered from a side wall of the vehicle. Usually the trunnion member is mounted for rotation about its vertical axis, relative to the tubular intermediate member, and the tubular intermediate member is mounted for vertical adjustment, with the trunnion member, relative to the base member.

The seat, per se, is usually well constructed and upholstered and is relatively expensive. Because of the high quality of construction of the seat, per se, and because the seat may be removed merely by lifting it with the trunnion member out of the vertically disposed tubular intermediate member, it presents a theft temptation; and the theft of large numbers of such seats has become a problem. Even when the seat and trunnion member are bolted or screwed to the rest of the assembly theft has not been avoided because thieves have found it relatively easy to unscrew or unbolt the seat and trunnion member from the rest of the assembly.

SUMMARY OF THE INVENTION

A seat assembly constructed in accordance with the present invention embodies anti-theft structure which makes it extremely difficult for a thief to disassemble the seat and its supporting trunnion member from the rest of the assembly, yet it enables those who are charged with maintenance and repair of the seat assembly to accomplish such a disassembly at such times as it becomes desirable to do so.

The various elements of the assembly, comprising the trunnion member, the tubular intermediate member and the base member, are secured together in an assembled relation in such a manner that any bolts or screws which can be disengaged to permit removal of the trunnion member from the rest of the assembly are relatively inaccessible, and the trunnion member cannot be removed without first destroying part of the securing structure. This provides an effective mechanical and psychological deterrent to theft.

Other features and advantages are inherent in the structure claimed and disclosed or will become apparent to those skilled in the art from the following detailed description in conjunction with the accompanying diagrammatic drawings.

BRIEF DESCRIPTION OF THE DRAWING

FIG. 1 is a perspective illustrating one embodiment of a seat assembly constructed in accordance with the present invention;

FIG. 2 is a vertical sectional view taken along line 2—2 in FIG. 1 and showing the assembly in a vertically raised position;

FIG. 3 is a vertical sectional view taken along line 3—3 in FIG. 2 showing the assembly in a lowered position;

FIG. 4 is a perspective of a second embodiment of a seat assembly constructed in accordance with the present invention;

FIG. 5 is a vertical sectional view taken along line 5—5 in FIG. 4 showing the assembly in a raised position;

FIG. 6 is a vertical sectional view taken along line 6—6 in FIG. 5 showing the assembly in a lowered position; and FIG. 7 is a horizontal sectional view taken along line 7—7 in FIG. 6.

DETAILED DESCRIPTION OF PREFERRED EMBODIMENTS

Referring initially to FIGS. 1-3, indicated generally at 20 is a first embodiment of a seat assembly constructed in accordance with the present invention. Atop assembly 20 is an upholstered seat 21 having a frame 22 attached atop a trunnion member 23 having a lower portion 24 fitting inside the upper portion of an intermediate member or first tube 25 telescopically mounted within a base member or second tube 26 in turn supported by frame members 27 extending outward from an interior side wall (not shown) of a vehicle such as a locomotive.

Trunnion member 23 has an upper peripheral lip portion 30 which rests atop the top edge 40 of first tube 25. Trunnion member 23 is mounted for rotation, relative to first tube 25, about the vertical axis of trunnion member lower portion 24 and tube 26.

First tube 25 includes a plurality of vertically spaced first holes 41 and a plurality of vertically spaced second holes 42 each diametrically opposed to one of the vertically spaced first holes 41. Base tube 26 has a pair of diametrically opposed grooves 45, 46 in the upper edge thereof. First tube 25 is vertically movable within base tube 26, and first tube 25 can be maintained in a vertically adjusted position relative to second tube 26 by aligning the holes 45, 46 on first tube 25 with the grooves 45, 46 in second tube 26 and inserting a holding pin 47 through groove 45, hole 41, hole 42 and groove 46, as shown in FIGS. 1-3.

The three members of the assembly, namely trunnion member 23, intermediate member 25 and base member 26 are secured together in an assembled relation by structure now to be described. Located within tubes 25, 26 is a vertically disposed link member 50 having an upper end portion 51 detachably engaged to the lower portion 24 of trunnion member 23 by a threaded first securing element 52. A washer 53 composed of nylon or other low friction material is disposed between the head of threaded member 52 and upper portion 51 of link member 50 to facilitate rotation of trunnion member 23 relative to link member 50.

Link member 50 has a lower end portion 55 secured to the lower portion 43 of intermediate tubular member 25 by a drive rivet or second securing element 56. Utilization of link member 50 to connect together trunnion member 23 and intermediate member 25 effectively ties the two members together for vertical movement. One cannot be moved vertically without also moving the other.

When assembled together in the manner described above, trunnion member 23 is rotatable about its vertical axis relative to intermediate tubular member 25, and is vertically movable with intermediate member 25 relative to base member 26, between a lowermost position shown in FIG. 3 and a plurality of raised positions one of which is shown in FIG. 2. Typically, in some embodiments in which intermediate member 25 has an external diameter of 2¾ inches, the distance between the bottom of member 25 and the vehicle floor may vary between 1½ – 3 inches, when member 25 is in its lowermost position, and 4½ – 6 inches when member 25 is in its uppermost position.

When the parts are put together, the sequence of assembly is as follows. Link member 50 is attached to trunnion member lower portion 24, with washer 53 inserted between link member upper portion 51 and threaded member 52. Then, with link member 50 dangling from the trunnion member, the latter's lower portion 24 is inserted inside intermediate tubular member 25 which is then inserted into base member 26. Drive rivet 56 is then inserted through openings in the bottom of intermediate member 25 and link member bottom portion 55, and rivet 56 is driven in place, causing tail 58 of drive rivet 56 to expand into the disposition shown in FIGS. 2 and 3.

Because trunnion member 23 is connected by link member 50 to intermediate member 25, trunnion member 23 cannot be lifted out of intermediate member 25. Lifting of trunnion member 23 merely raises intermediate member 25 until drive rivet head 57 strikes the bottom edge of base member 26. When this occurs no part of the assembly can be raised further.

Theft of seat 21 is not possible without disengaging trunnion member 23 from intermediate member 25. This, in turn, cannot be accomplished without either disengaging threaded member 52 or removing drive rivet 56. As shown in FIGS. 2 and 3, because of the relationship of members 24, 25, 26 when assembled, threaded member 52 is not accessible from below the assembly, and this is so, whether trunnion member 23 and intermediate member 25 are in their lowermost or uppermost positions. The only accessible securing element is drive rivet 56, and this cannot be removed from a securing disposition without destroying the drive rivet. This in turn constitutes an effective mechanical and psychological deterrent to pilferage of the seat.

Should maintenance or repair work require removal of seat 21 from the assembly, this can be accomplished either by drilling through drive rivet head 57 or by grinding off the head of the drive rivet and then punching the rivet into the interior of tubular intermediate member 25.

FIGS. 4–7 illustrate another embodiment 60 of a seat assembly in accordance with the present invention. Assembly 60 includes a trunnion member 63 having a lower portion 64 received within the upper portion of an intermediate member or first tube 65 mounted within a base member or second tube 66 including a base plate 67 resting on the floor of the vehicle. Trunnion member 63 has a lip portion 70 which rests atop top edge 80 of intermediate member 65, and trunnion member 63 is mounted for rotation about its vertical axis, relative to intermediate member 65, in the same manner as trunnion member 23 was mounted for rotation relative to intermediate member 25 in the embodiment of FIGS. 1–3.

Intermediate member 65 includes a plurality of vertically disposed holes 81, 82, and base member 66 includes a pair of diametrically opposed grooves 85, 86 in the upper edge thereof. Holes 81, 82 and grooves 85, 86 receive a pin 87 for maintaining intermediate member 65 in a vertically adjusted position relative to base member 66, similar to the structure used on embodiment 20 illustrated in FIGS. 1–3. Pin 87 may be connected by a chain 88 to intermediate member 65.

Trunnion member 63, intermediate member 65 and base member 66 are assembled together with structure now to be described. Located within tubes 65, 66 are first and second vertically disposed link members 89, 90. First or upper link member 89 has an upper end 91 detachably engaged to the lower portion 64 of trunnion member 63 by a threaded securing element 92. A washer 93 composed of nylon or other low friction material facilitates rotation of trunnion member 63 relative to the rest of the assembly.

Second or lower link member 90 has a lower end 95 detachably engaged by a threaded securing element 96 to a bracket 97 mounted on base plate 67.

Upper link member 89 is mounted for vertical movement relative to lower link member 90 by structure which includes a slot 100 in lower link member 90 and a grooved, semi-tubular rivet 101 attached to upper link member 89 and engaging the edges of slot 100.

Trunnion member 63 is connected to and mounted on intermediate member 65 by means of a peripheral groove 102 in trunnion member lower portion 64 and a drive rivet 103 which extends through an opening in the upper part of intermediate member 65 and into groove 102 on trunnion member 63 which receives and holds the tail of the drive rivet. When thus engaged, trunnion member 63 and intermediate member 65 move vertically together relative to base member 66.

When assembled in the manner described above neither of threaded securing elements 92, 96 are accessible. The only securing element which is accessible is drive rivet 103, and this cannot be removed from a securing disposition without destroying the drive rivet. This effectively prevents removal from the assembly of trunnion member 63 with seat 21 attached thereto.

At such time as it becomes necessary to remove trunnion member 63 for maintenance and repair on seat 21, this can be done by drilling out drive rivet 103.

The assembly is initially put together as follows. The two link members 89, 90 are connected together and then spread apart. Bottom link member 90 is attached to bracket 97 with an extension wrench. Intermediate member 65 is then inserted over link members 89, 90 and into base member 66. Upper link member 89 is then attached to the bottom of trunnion member 63. The two link members are then contracted together until lip portion 30 of trunnion member 63 rests atop the top edge 80 of intermediate member 65 at which time drive rivet 103 is driven into place.

In both embodiments 20 and 60, the drive rivet is the only securing element which is accessible to a potential thief, and the drive rivet cannot be removed from a securing position without destruction of the drive rivet. This is an effective mechanical and psychological deterrent to any theft.

The only securing elements which can be removed from a securing disposition without destruction thereof are the threaded elements 52 in embodiment 20 and threaded elements 92, 96 in embodiment 60. Removal of these elements would permit removal of the trunnion member and seat from the assembly, but none of elements 52 or 92, 96 are accessible.

The foregoing detailed description has been given for clearness of understanding only, and no unnecessary limitations should be understood therefrom, as modifications will be obvious to those skilled in the art.

What is claimed is:

1. A seat assembly comprising:
   a vertically disposed base member;
   a vertically disposed trunnion member including means for supporting a seat;
   a vertically disposed intermediate member;
   means mounting said intermediate member for vertical adjustment relative to said base member;
   means mounting said trunnion member for rotation about a vertical axis relative to said intermediate member and for vertical adjustment with said intermediate member;
   a plurality of securing elements for securing all three of said members together;
   means for preventing the removal of said trunnion member from said assembly without the removal of at least one of said securing elements;
   said plurality of securing elements including at least one detachably engaged first securing element removable from a securing disposition;
   and means, including said members, for preventing access to all of the detachably engageable securing elements.

2. A seat assembly as recited in claim 1 and comprising an accessible second securing element irremovable from a securing disposition without destruction thereof.

3. A seat assembly as recited in claim 2 wherein:
   said detachably engaged first securing element comprises means detachably engaging said trunnion member to said intermediate member; and
   said accessible second securing element is located on said intermediate member and is engageable with said base member.

4. A seat assembly as recited in claim 2 wherein:
   said intermediate member comprises a tube;
   said trunnion member is received within the top of said tube and has a bottom portion located in the top portion of the tube;
   and said assembly includes a vertically disposed link member located within said tube, said link member having an upper end attached by said detachably engaged first securing element to said bottom portion of the trunnion member and a lower end attached to the lower portion of said tube by said accessible second securing element.

5. A seat assembly as recited in claim 2 wherein:
   said detachably engaged first securing element comprises means detachably engaging said trunnion member to said base member;
   and said accessible second securing element is located on said intermediate member and engages said trunnion member.

6. A seat assembly as recited in claim 2 wherein:
   said intermediate member comprises a first tube;
   said trunnion member is received within the top of said first tube and has a bottom portion located in the top portion of the first tube;
   said base member comprises a second tube;
   said intermediate member is received within said base member;
   said assembly includes vertically disposed first and second link members located within said tubes;
   means connecting said link members together and mounting said first link member for vertical movement relative to said second link member;
   said first link member having an upper end detachably engaged to said bottom portion of the trunnion member;
   said second link member having a lower end detachably engaged to the bottom portion of said base member;
   one of said link members being detachably engaged to its respective trunnion or base member by said detachably engaged first securing element;
   said intermediate member being secured to said trunnion member by said accessible second securing element.

7. A seat assembly as recited in claim 6 wherein:
   said accessible second securing element is a drive rivet;
   and said trunnion member has a peripheral groove for receiving the tail of said drive rivet.

8. A seat assembly comprising:
   a vertically disposed base member;
   a vertically disposed trunnion member including means for supporting a seat;
   a vertically disposed intermediate member;
   means mounting said intermediate member for vertical adjustment relative to said base member;
   means mounting said trunnion member for rotation about a vertical axis relative to said intermediate member and for vertical adjustment with said intermediate member;
   and means, including a plurality of securing elements, for securing all three of said members in assembled relation;
   one of said securing elements being accessible;
   said securing means including means cooperating with said members for preventing removal of said trunnion member from said assembly until said one securing element is removed from a securing disposition;
   said one securing element being irremovable from a securing disposition without destruction thereof.

9. A seat assembly as recited in claim 8 wherein said one securing element is the only securing element which is accessible.

* * * * *